US012209781B2

(12) United States Patent
Akimoto et al.

(10) Patent No.: US 12,209,781 B2
(45) Date of Patent: Jan. 28, 2025

(54) ROTARY COMPRESSOR

(71) Applicant: FUJITSU GENERAL LIMITED, Kanagawa (JP)

(72) Inventors: Ryo Akimoto, Kanagawa (JP); Junya Tanaka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 160 days.

(21) Appl. No.: 17/793,792

(22) PCT Filed: Sep. 30, 2020

(86) PCT No.: PCT/JP2020/037137

§ 371 (c)(1),
(2) Date: Jul. 19, 2022

(87) PCT Pub. No.: WO2021/152914

PCT Pub. Date: Aug. 5, 2021

(65) Prior Publication Data

US 2023/0076038 A1 Mar. 9, 2023

(30) Foreign Application Priority Data

Jan. 30, 2020 (JP) ................................ 2020-014044

(51) Int. Cl.
*F25B 43/00* (2006.01)
*F04C 29/06* (2006.01)
*F25B 31/02* (2006.01)

(52) U.S. Cl.
CPC ............ *F25B 43/006* (2013.01); *F04C 29/06* (2013.01); *F25B 31/026* (2013.01);
(Continued)

(58) Field of Classification Search
CPC ............ F04C 2240/30; F04C 2240/804; F04C 2240/805; F05C 2225/08; F25B 43/006; F04B 39/0044
(Continued)

(56) References Cited

U.S. PATENT DOCUMENTS 5,306,121 A * 4/1994 Heflin ..................... F16F 15/08
417/363
2005/0069423 A1* 3/2005 Ebara .................... F04C 23/001
417/313
(Continued)

FOREIGN PATENT DOCUMENTS

CN 106415007 A 2/2017
EP 3168475 A1 5/2017
(Continued)

OTHER PUBLICATIONS

Chinen, Compressor and Refrigeration Cycle ('JP2019199997A_MT.pdf'), (Nov. 2019) (Year: 2019).*
(Continued)

*Primary Examiner* — Kenneth J Hansen
(74) *Attorney, Agent, or Firm* — Paratus Law Group, PLLC

(57) ABSTRACT

A rotary compressor includes a compressor housing that is provided with a refrigerant discharge portion and refrigerant suction portions, a compression unit that is arranged in the compressor housing and compresses a refrigerant, sucked from the suction portions, and discharges it from the discharge portion, a motor that is arranged in the compressor housing and drives the compression unit, an accumulator that is connected to the suction portions, and a mounting member that secures the accumulator to the compressor housing. The compressor housing and an accumulator container of the accumulator are made of a metal material. The mounting member is at least partially made of a resin material and has a first joint portion, which is joined to an outer peripheral surface of the compressor housing.

6 Claims, 4 Drawing Sheets

(52) U.S. Cl.
CPC ...... *F04C 2240/30* (2013.01); *F04C 2240/40* (2013.01); *F04C 2270/12* (2013.01); *F05C 2225/08* (2013.01); *F25B 2500/13* (2013.01)

(58) Field of Classification Search
USPC .................................................. 248/200–210
See application file for complete search history.

(56) References Cited

U.S. PATENT DOCUMENTS

| | | | | |
|---|---|---|---|---|
| 2017/0130721 | A1 | 5/2017 | Morozumi | |
| 2019/0055961 | A1* | 2/2019 | Watanabe | B29C 45/14 |
| 2019/0145394 | A1* | 5/2019 | Houthoofdt | F04B 53/003<br>417/312 |

FOREIGN PATENT DOCUMENTS

| | | | |
|---|---|---|---|
| JP | 2004-218559 | A | 8/2004 |
| JP | 2007-046572 | A | 2/2007 |
| JP | 2012-077721 | A | 4/2012 |
| JP | 2016-016429 | A | 2/2016 |
| JP | 2017-089521 | A | 5/2017 |
| JP | 2019-199997 | A | 11/2019 |

OTHER PUBLICATIONS

Jan. 17, 2024, Chinese Office Action issued for related CN Application No. 202080093983.1.

* cited by examiner

ROTARY COMPRESSOR

CROSS REFERENCE TO PRIOR APPLICATION

This application is a National Stage Patent Application of PCT International Patent Application No. PCT/JP2020/037137 (filed on Sep. 30, 2020) under 35 U.S.C. § 371, which claims priority to Japanese Patent Application No. 2020-014044 (filed on Jan. 30, 2020), which are all hereby incorporated by reference in their entirety.

FIELD

The present invention relates to a rotary compressor.

BACKGROUND

As compressors for air conditioners and refrigerators, a rotary compressor has been known that includes a compressor housing that is provided with a refrigerant discharge portion and a refrigerant suction portion, a compression unit that compresses the refrigerant, sucked from the suction portion, and discharges it from the discharge portion, a motor that drives the compression unit, and an accumulator that is fixed outside the compressor housing and connected to the suction portion.

In this type of rotary compressor, the accumulator has a metal-made accumulator container that includes a structure supported by a mounting bracket, which is welded to the outer peripheral surface of the metal-made compressor housing.

CITATION LIST

Patent Literature

Patent Literature 1: Japanese Patent Application Laid-open No. 2017-89521

SUMMARY

Technical Problem

During the operation of the above-described rotary compressor, vibrations, which are generated in the metal compressor housing, are transmitted to the metal accumulator container via the mounting bracket, and cause a problem of increased noise as the accumulator container resonates, for example.

The disclosed technology has been made in view of the foregoing, and an object thereof is to provide a rotary compressor capable of suppressing the generation of vibration and reducing noise.

Solution to Problem

According to an aspect of an embodiments in the present application, a rotary compressor includes: a compressor housing that is provided with a refrigerant discharge portion and a refrigerant suction portion; a compression unit that is arranged inside the compressor housing and configured to compress a refrigerant, sucked from the suction portion, and discharge the refrigerant from the discharge portion; a motor that is arranged inside the compressor housing and configured to drive the compression unit; an accumulator that is connected to the suction portion; and a mounting member that is configured to secure the accumulator to the compressor housing, wherein the compressor housing and an accumulator container of the accumulator are made of a metal material, and the mounting member is at least partially made of a resin material and has a first joint portion, which is joined to an outer peripheral surface of the compressor housing.

Advantageous Effects of Invention

According to one aspect of the rotary compressor disclosed in the present application, the generation of vibration can be suppressed, and the mechanical strength of the accumulator in the mounted state can be ensured.

DESCRIPTION OF EMBODIMENTS

The following describes in detail an exemplary embodiment of a rotary compressor disclosed in the present application with reference to the accompanying drawings. The rotary compressor, disclosed in the present application, is not limited by the following exemplary embodiments.

First Embodiment

Configuration of Rotary Compressor

Figure 1:
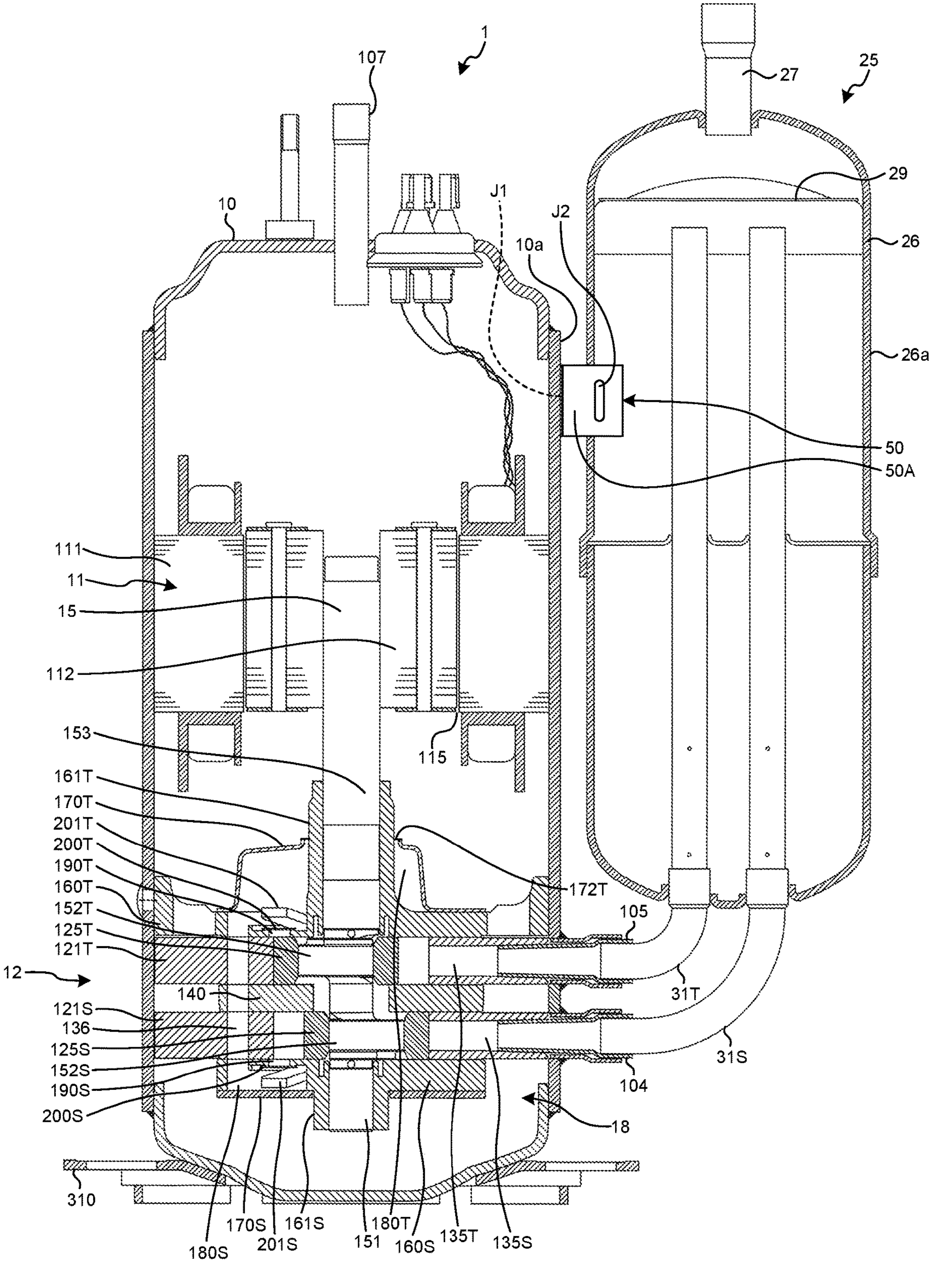
FIG. 1 is a longitudinal sectional view illustrating a rotary compressor of a first embodiment.
Figure 2:
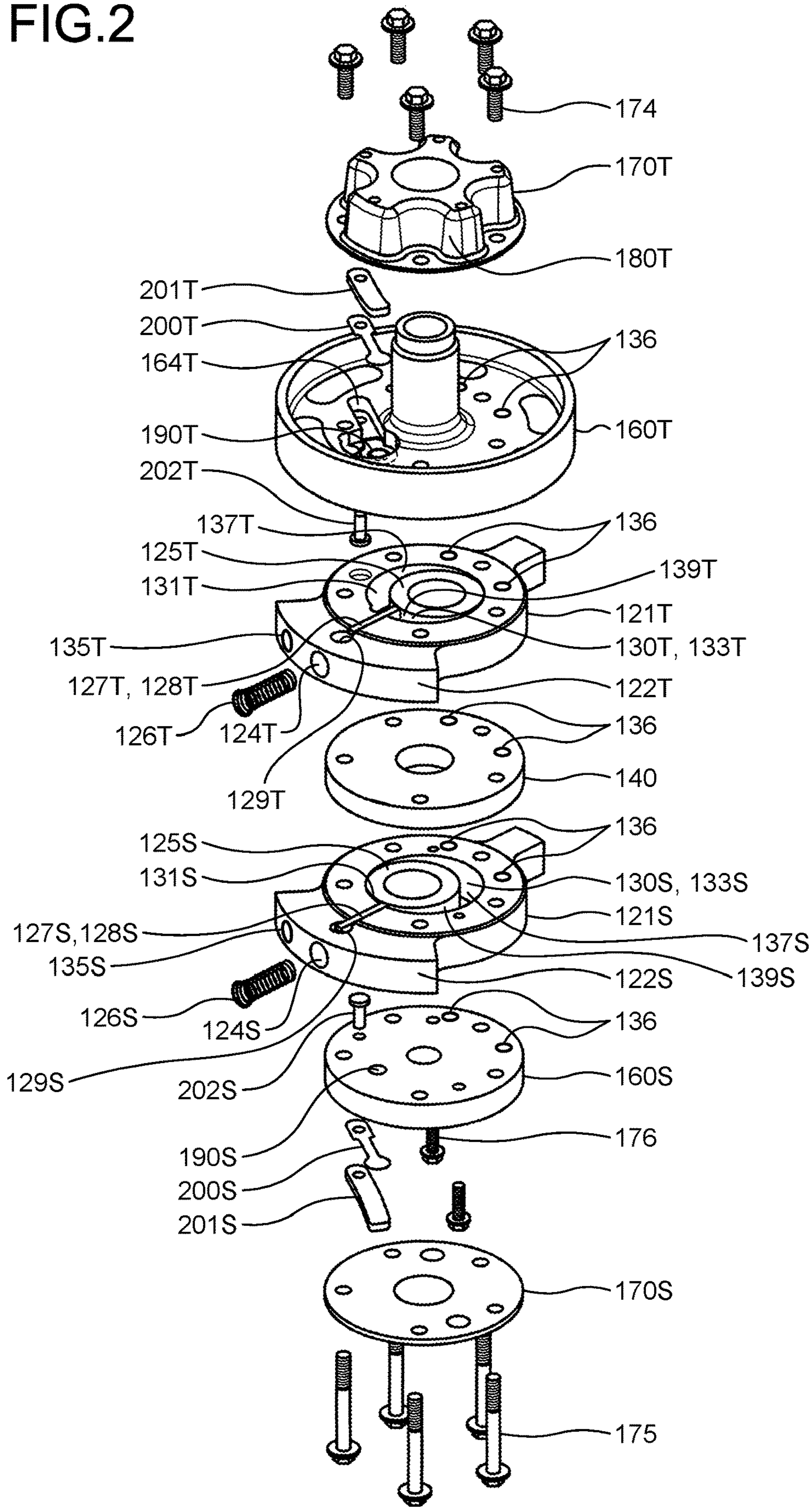
FIG. 2 is an exploded perspective view illustrating a compression unit of the rotary compressor of the first embodiment.

FIG. 1 is a longitudinal sectional view illustrating a rotary compressor of a first embodiment. FIG. 2 is an exploded perspective view illustrating a compression unit of the rotary compressor of the first embodiment.

As illustrated in FIG. 1, a rotary compressor 1 includes a compression unit 12, which is arranged at a lower portion in a sealed and vertical cylindrical compressor housing 10, a motor 11, which is arranged at an upper portion in the compressor housing 10 and configured to drive the compression unit 12 via a rotating shaft 15, and a vertical cylindrical accumulator 25, which is fixed to an outer peripheral surface of the compressor housing 10.

The accumulator 25 includes a vertically placed cylindrical accumulator container 26, and a low-pressure introduction pipe 27, which is connected to the upper portion of the accumulator container 26. The accumulator container 26 is connected to an upper cylinder chamber 130T (see FIG. 2) of an upper cylinder 121T via an upper suction pipe 105 and an L-shaped low-pressure connecting pipe 31T, and is connected to a lower cylinder chamber 130S (see FIG. 2) of a lower cylinder 121S via a lower suction pipe 104 and an L-shaped low-pressure connecting pipe 31S. The low-pressure introduction pipe 27 is provided through the upper portion of the accumulator container 26, and is connected to the low-pressure side in the refrigeration cycle. In the accumulator container 26, between the low-pressure introduction pipe 27 and the low-pressure connecting pipes 31T and 31S, a filter 29, which captures foreign matter from the refrigerant supplied from the low-pressure introduction pipe 27, is provided. The accumulator 25 sends the separated gas refrigerant from the accumulator container 26 to the compressor housing 10 through the two low-pressure connecting pipes 31T and 31S. The accumulator container 26 is secured to an outer peripheral surface 10*a* of the compressor housing 10 by an accumulator holder 50, which will be described later.

The motor 11 includes a stator 111, which is arranged on the outside, and a rotor 112, which is arranged on the inside. The stator 111 is fixed to the inner peripheral surface of the compressor housing 10 in a shrink fitted state, and the rotor 112 is fixed to the rotating shaft 15 in a shrink fitted state.

A sub shaft portion 151 below a lower eccentric portion 152S is rotatably supported by a sub bearing portion 161S provided on a lower end plate 160S, a main shaft portion 153 above an upper eccentric portion 152T is rotatably supported by a main bearing portion 161T, which is provided on an upper end plate 160T, and an upper piston 125T and a lower piston 125S are supported by the upper eccentric portion 152T and the lower eccentric portion 152S respectively, which are provided with a phase difference of 180 degrees to each other, whereby the rotating shaft 15 is rotatably supported with respect to the compression unit 12 and causes the upper piston 125T and the lower piston 125S to revolve along an inner peripheral surface 137T of the upper cylinder 121T and an inner peripheral surface 137S of the lower cylinder 121S respectively by the rotation.

In the inside of the compressor housing 10, lubricating oil 18 is sealed by an amount that substantially immerses the compression unit 12, in order to ensure lubricity of sliding portions such as the upper piston 125T and the lower piston 125S, and the like sliding in the compression unit 12, and to seal an upper compression chamber 133T (see FIG. 2) and a lower compression chamber 133S (see FIG. 2). On the lower side of the compressor housing 10, fixed is a mounting leg 310 (see FIG. 1) that latches to a plurality of elastic supporting members (not depicted) that support the entire rotary compressor 1.

As illustrated in FIG. 1, the compressor housing 10 is provided with a discharge pipe 107 at the upper portion as a discharge portion for discharging a refrigerant, and an upper suction pipe 105 and a lower suction pipe 104 on the side portion as suction portions for sucking the refrigerant. The compression unit 12 compresses the refrigerant, which is sucked in from the upper suction pipe 105 and the lower suction pipe 104, and discharges it from the discharge pipe 107. As illustrated in FIG. 2, the compression unit 12 is made up of, from above, stacking an upper end plate cover 170T having a bulging portion in which a hollow space is formed inside, the upper end plate 160T, the annular upper cylinder 121T, an intermediate partition plate 140, the annular lower cylinder 121S, the lower end plate 160S, and a flat plate-shaped lower end plate cover 170S. The entire compression unit 12 is fixed from above and below by a plurality of through bolts 174 and 175 and auxiliary bolts 176 arranged substantially concentrically.

As illustrated in FIG. 2, on the upper cylinder 121T, a cylindrical inner peripheral surface 137T is formed. On the inside of the inner peripheral surface 137T of the upper cylinder 121T, the upper piston 125T, which has an outer diameter smaller than the inner diameter of an inner peripheral surface 137T of the upper cylinder 121T, is arranged, and between the inner peripheral surface 137T and an outer peripheral surface 139T of the upper piston 125T, the upper compression chamber 133T, which sucks, compresses, and discharges the refrigerant, is formed. On the lower cylinder 121S, a cylindrical inner peripheral surface 137S is formed. On the inside of the inner peripheral surface 137S of the lower cylinder 121S, the lower piston 125S, which has an outer diameter smaller than the inner diameter of the inner peripheral surface 137S of the lower cylinder 121S, is arranged, and between the inner peripheral surface 137S and an outer peripheral surface 139S of the lower piston 125S, the lower compression chamber 133S, which sucks, compresses, and discharges the refrigerant, is formed.

The upper cylinder 121T includes an upper lateral projecting portion 122T projecting in the radial direction of the cylindrical inner peripheral surface 137T from a circular outer peripheral portion. On the upper lateral projecting portion 122T, an upper vane groove 128T, which extends radially outward from the upper cylinder chamber 130T, is provided. In the upper vane groove 128T, an upper vane 127T is arranged to be slidable. The lower cylinder 121S includes a lower lateral projecting portion 122S projecting in the radial direction of the cylindrical inner peripheral surface 137S from the circular outer peripheral portion. On the lower lateral projecting portion 122S, a lower vane groove 128S, which extends radially outward from the lower cylinder chamber 130S, is provided. In the lower vane groove 128S, a lower vane 127S is arranged to be slidable.

On the upper cylinder 121T, from the outer lateral surface at the position overlapping the upper vane groove 128T, an upper spring hole 124T is provided at a depth not running through the upper cylinder chamber 130T. At the upper spring hole 124T, an upper spring 126T is arranged. On the lower cylinder 121S, from the outer lateral surface at the position overlapping the lower vane groove 128S, a lower spring hole 124S is provided at a depth not running through the lower cylinder chamber 130S. At the lower spring hole 124S, a lower spring 126S is arranged.

On the lower cylinder 121S, formed is a lower pressure guiding path 129S that guides the compressed refrigerant in the compressor housing 10 by making the outside in the radial direction of the lower vane groove 128S communicate with the inside of the compressor housing 10 via an opening, and that applies a back pressure to the lower vane 127S by the pressure of the refrigerant. The compressed refrigerant in the compressor housing 10 is also introduced from the lower spring hole 124S. On the upper cylinder 121T, formed is an upper pressure guiding path 129T that guides the compressed refrigerant in the compressor housing 10 by making the outside in the radial direction of the upper vane groove 128T communicate with the inside of the compressor housing 10 via an opening and that applies a back pressure to the upper vane 127T by the pressure of the refrigerant. The compressed refrigerant in the compressor housing 10 is also introduced from the upper spring hole 124T.

On the upper lateral projecting portion 122T of the upper cylinder 121T, an upper suction hole 135T as a through-hole to which the upper suction pipe 105 is fitted, is provided. On the lower lateral projecting portion 122S of the lower cylinder 121S, a lower suction hole 135S as a through-hole to which the lower suction pipe 104 is fitted, is provided.

The upper cylinder chamber 130T is closed at the upper and lower sides by the upper end plate 160T and the intermediate partition plate 140, respectively. The lower cylinder chamber 130S is closed at the upper and lower sides by the intermediate partition plate 140 and the lower end plate 160S, respectively.

Figure 3:
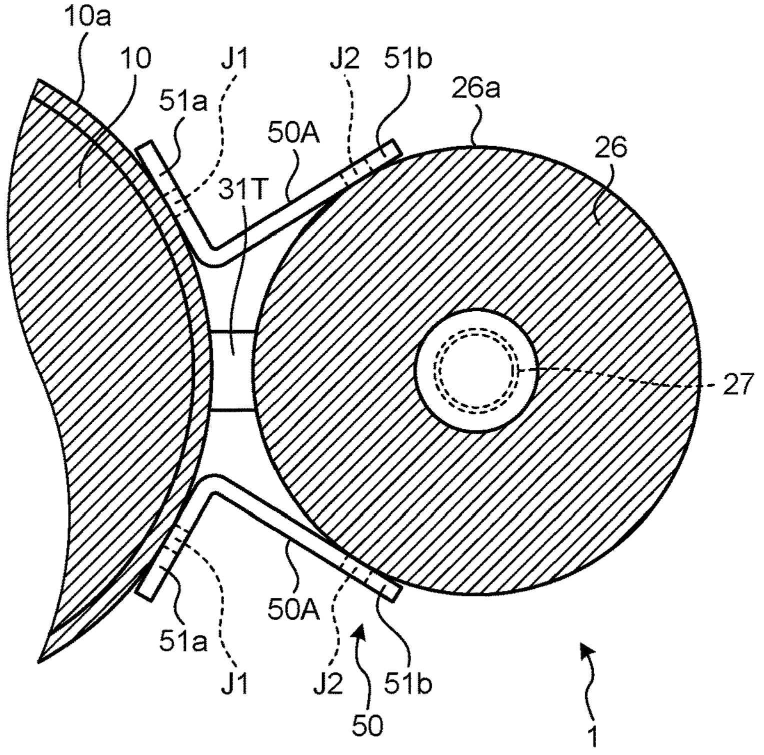
FIG. 3 is a plan view illustrating a principal part of the rotary compressor of the first embodiment.

The upper cylinder chamber 130T is sectioned, as the upper vane 127T is pressed by the upper spring 126T and is brought into contact with the outer peripheral surface 139T of the upper piston 125T, into an upper suction chamber 131T that communicates with the upper suction hole 135T, and into the upper compression chamber 133T that communicates with an upper discharge hole 190T, which is provided on the upper end plate 160T (see FIG. 3). The lower cylinder chamber 130S is sectioned, as the lower vane 127S is pressed by the lower spring 126S and is brought into contact with the outer peripheral surface 139S of the lower piston 125S, into a lower suction chamber 131S that communicates with the lower suction hole 135S, and into the lower compression chamber 133S that communicates with a lower discharge hole 190S, which is provided on the lower end plate 160S (see FIG. 3).

As illustrated in FIG. 2, on the upper end plate 160T, the upper discharge hole 190T, which passes through the upper end plate 160T and communicates with the upper compression chamber 133T of the upper cylinder 121T, is provided, and on the outlet side of the upper discharge hole 190T, an upper valve seat (not depicted) is formed around the upper discharge hole 190T. On the upper end plate 160T, an upper discharge-valve accommodating recessed portion 164T, which extends in a groove shape in the circumferential direction of the upper end plate 160T from the position of the upper discharge hole 190T, is formed.

In the upper discharge-valve accommodating recessed portion 164T, accommodated are a reed-valve type upper discharge valve 200T for which the rear end portion is fixed in the upper discharge-valve accommodating recessed portion 164T by an upper rivet 202T and the front portion opens and closes the upper discharge hole 190T, and an entire upper discharge valve retainer 201T for which the rear end portion is overlapped with the upper discharge valve 200T and fixed in the upper discharge-valve accommodating recessed portion 164T by the upper rivet 202T and the front portion is curved (warped) and regulates the opening degree of the upper discharge valve 200T.

On the lower end plate 160S, the lower discharge hole 190S, which passes through the lower end plate 160S and communicates with the lower compression chamber 133S of the lower cylinder 121S, is provided. On the lower end plate 160S, a lower discharge-valve accommodating recessed portion (not depicted), which extends in a groove shape in the circumferential direction of the lower end plate 160S from the position of the lower discharge hole 190S, is formed.

In the lower discharge-valve accommodating recessed portion, accommodated are a reed-valve type lower discharge valve 200S for which the rear end portion is fixed in the lower discharge-valve accommodating recessed portion by a lower rivet 202S and the front portion opens and closes the lower discharge hole 190S, and an entire lower discharge valve retainer 201S for which the rear end portion is overlapped with the lower discharge valve 200S and fixed in the lower discharge-valve accommodating recessed portion by the lower rivet 202S and the front portion is curved (warped) and regulates the opening degree of the lower discharge valve 200S.

In addition, between the upper end plate 160T and the upper end plate cover 170T having the bulging portion that are closely fixed to each other, an upper end-plate cover chamber 180T is formed. Between the lower end plate 160S and the flat plate-shaped lower end plate cover 170S that are closely fixed to each other, a lower end-plate cover chamber 180S (see FIG. 1) is formed. A plurality of refrigerant passage holes 136, which run through the lower end plate 160S, the lower cylinder 121S, the intermediate partition plate 140, the upper end plate 160T, and the upper cylinder 121T and that communicates with the lower end-plate cover chamber 180S and the upper end-plate cover chamber 180T, is provided.

The following describes the flow of the refrigerant by the rotation of the rotating shaft 15. In the upper cylinder chamber 130T, by the rotation of the rotating shaft 15, as the upper piston 125T, which is fitted to the upper eccentric portion 152T of the rotating shaft 15, revolves along the inner peripheral surface 137T of the upper cylinder 121T (outer peripheral surface of the upper cylinder chamber 130T), the upper suction chamber 131T sucks the refrigerant from the upper suction pipe 105 while expanding the volume, the upper compression chamber 133T compresses the refrigerant while reducing the volume, and when the pressure of the compressed refrigerant becomes higher than the pressure of the upper end-plate cover chamber 180T outside of the upper discharge valve 200T, the upper discharge valve 200T is opened and the refrigerant is discharged from the upper compression chamber 133T to the upper end-plate cover chamber 180T. The refrigerant, which is discharged to the upper end-plate cover chamber 180T, is discharged into the compressor housing 10 from an upper end-plate cover discharge hole 172T (see FIG. 1), which is provided on the upper end plate cover 170T.

Furthermore, in the lower cylinder chamber 130S, by the rotation of the rotating shaft 15, as the lower piston 125S, which is fitted to the lower eccentric portion 152S of the rotating shaft 15, revolves along the inner peripheral surface 137S of the lower cylinder 121S (outer peripheral surface of the lower cylinder chamber 130S), the lower suction chamber 131S sucks the refrigerant from the lower suction pipe 104 while expanding the volume, the lower compression chamber 133S compresses the refrigerant while reducing the volume, and when the pressure of the compressed refrigerant becomes higher than the pressure of the lower end-plate cover chamber 180S outside of the lower discharge valve 200S, the lower discharge valve 200S is opened and the refrigerant is discharged from the lower compression chamber 133S to the lower end-plate cover chamber 180S. The refrigerant, which is discharged to the lower end-plate cover chamber 180S, passes through the refrigerant passage holes 136 and the upper end-plate cover chamber 180T, and is discharged into the compressor housing 10 from the upper end-plate cover discharge hole 172T, which is provided on the upper end plate cover 170T.

The refrigerant, which is discharged into the compressor housing 10, is guided to the upper side of the motor 11 through a cutout (not depicted) provided on the outer periphery of the stator 111 and communicating with the upper and lower portions, a gap (not depicted) in a winding portion of the stator 111, or a gap 115 (see FIG. 1) between the stator 111 and the rotor 112, and is discharged from the discharge pipe 107 as a discharge portion, which is arranged on the upper portion of the compressor housing 10.

Characteristic Configuration of Rotary Compressor

Figure 4:
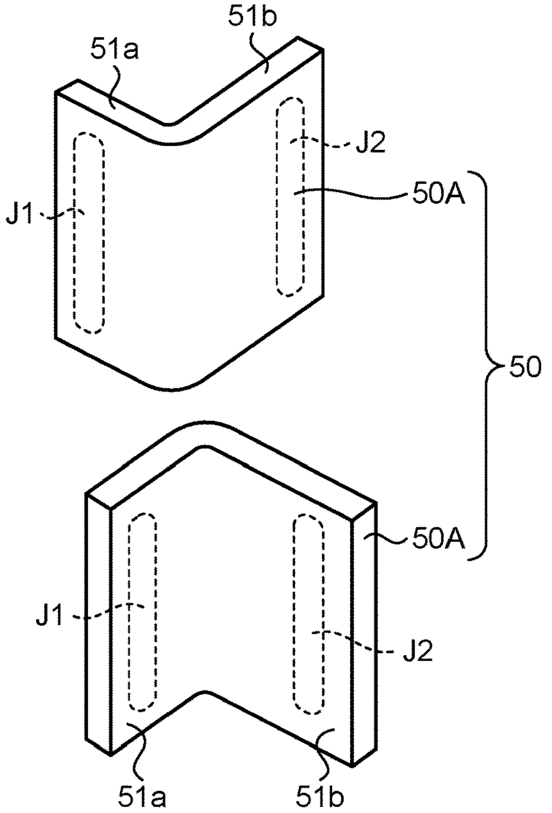
FIG. 4 is a perspective view illustrating an accumulator holder in the rotary compressor of the first embodiment.

Next, a characteristic configuration of the rotary compressor 1 of the first embodiment will be described. Features of the first embodiment include a mounting structure that secures the accumulator 25 to the compressor housing 10. FIG. 3 is a plan view illustrating a principal part of the rotary compressor 1 of the first embodiment. FIG. 4 is a perspective view illustrating an accumulator holder in the rotary compressor 1 of the first embodiment.

As illustrated in FIG. 3 and FIG. 4, the rotary compressor 1 of the first embodiment includes the accumulator holder 50 as a mounting member for securing the accumulator container 26 of the accumulator 25 to the compressor housing 10. In the first embodiment, the compressor housing 10 and the accumulator container 26 of the accumulator 25 are made of a metal material such as a steel plate.

The accumulator holder 50 has a set of mounting pieces 50A that is attached so that each sandwiches the compressor housing 10 and the accumulator container 26. The set of mounting pieces 50A is formed in the same shape only by a resin material. Each mounting piece 50A has one end portion 51*a* in contact with the outer peripheral surface 10*a* of the compressor housing 10, and the other end portion 51*b* in contact with an outer peripheral surface 26*a* of the accumulator container 26, and is formed in an L-shaped cross-section, in which the one end portion 51*a* and the other end portion 51*b* intersect.

Each mounting piece 50A is provided with a first joint portion J1, which is joined to the outer peripheral surface 10*a* of the compressor housing 10 at the one end portion 51*a*, and is provided with a second joint portion J2, which is joined to the outer peripheral surface 26*a* of the accumulator container 26 at the other end portion 51*b*.

The one end portion 51*a* of the mounting piece 50A is overlapped on the outer peripheral surface 10*a* of the compressor housing 10, and is irradiated with a laser from the one end portion 51*a* side toward the compressor housing 10 side, thereby joining the resin mounting piece 50A and the metal compressor housing 10. Similarly, the other end portion 51*b* of the mounting piece 50A is overlapped on the outer peripheral surface 26*a* of the accumulator container 26, and is irradiated with a laser from the other end portion 51*b* side toward the accumulator container 26 side, thereby joining the resin mounting piece 50A and the metal accumulator container 26. That is, in the first joint portion J1 and the second joint portion J2, joint portions J are formed by being irradiated with the laser from the resin material side toward the metal material side. The first joint portion J1 and the second joint portion J2 are formed in a line shape extending in the vertical direction (axial direction of the rotating shaft 15) in the compressor housing 10, for example.

In order to properly join the one end portion 51*a* of the mounting piece 50A to the compressor housing 10 and the other end portion 51*b* of the mounting piece 50A to the accumulator container 26 by laser bonding, it is preferable that, as the resin material for forming the mounting piece 50A, a thermoplastic resin material be used and have functional groups, which are reactive with the metal materials for forming the compressor housing 10 and the accumulator container 26. As such resin materials, for example, polyamide (PA) and polybutylene terephthalate (PBT) are used.

As the resin material for forming the mounting piece 50A, it is preferable that a super engineering plastic such as polyether nitrile (PEN) be used, for example. This allows the mounting piece 50A to properly ensure the mechanical strength of the portions other than the first joint portion J1 and the second joint portion J2 and the heat resistance to the compressor housing 10 and the accumulator container 26.

As the resin material for forming the mounting piece 50A, in order to enhance the vibration-damping properties by the mounting piece 50A, a resin material, which contains a vibration-damping agent, may be used. As such a vibration-damping agent, for example, N-dicyclohexylbenzothiazyl-2-sulfenamide (DCHBSA), 2-mercaptobenzothiazole (MBT), and the like are used.

The mounting piece 50A of the accumulator holder 50 only needs to be at least partially made of a resin material, and for example, the one end portion 51*a* may be made of a metal material, and the other end portion 51*b* may be made of a resin material. In this case, the metal-made one end portion 51*a* and the resin-made other end portion 51*b* may be integrally molded by insert molding, for example. In such a mounting piece 50A, the first joint portion J1 of the one end portion 51*a* is joined by spot welding, and the second joint portion J2 of the other end portion 51*b* is joined by laser bonding.

The other end portion 51*b* of the mounting piece 50A in the first embodiment has the second joint portion J2, which is joined to the accumulator container 26 by laser bonding, but is not limited to a structure having the second joint portion J2. Although not illustrated, the other end portion 51*b* of the mounting piece 50A may hold the accumulator container 26 using a fixing band, in place of the second joint portion J2, for example. In this case, the fixing band is hung along the circumferential direction of the accumulator container 26, and both ends of the fixing band are fixed to the respective other end portions 51*b* of the set of mounting pieces 50A (see FIG. 5).

Effect of First Embodiment

In the rotary compressor 1 of the first embodiment, the compressor housing 10 and the accumulator container 26 are made of a metal material, and the accumulator holder 50 is at least partially made of a resin material and has the first joint portion J1 that is joined to the outer peripheral surface 10*a* of the compressor housing 10. In general, the modulus of longitudinal elasticity of a resin material is less than 1/100 of that of a metal material, making it hard to transmit vibration as compared with the metal material. Thus, according to the first embodiment, it is possible to use the accumulator holder 50 made of a resin material having high vibration-damping properties in order to fix the accumulator container 26 to the compressor housing 10, and as compared with a structure having a mounting bracket made of a metal material, the generation of vibration of the rotary compressor 1 can be suppressed and the noise associated with the vibration can be reduced.

The accumulator holder 50 in the first embodiment may be made only of a resin material. In this case, the accumulator holder 50 has the second joint portion J2 that is joined to the outer peripheral surface 26*a* of the accumulator container 26. This allows the accumulator holder 50 to be made only of a resin material having high vibration-damping properties, and allows the generation of vibration of the rotary compressor 1 to be further reduced and the noise associated with the vibration to be further reduced.

The accumulator holder 50 in the first embodiment has the set of mounting pieces 50A, and in each of the set of mounting pieces 50A, the first joint portion J1 is provided at the one end portion 51*a*, and the second joint portion J2 is provided at the other end portion 51*b*. As a result, as the first joint portion J1 between the resin-made accumulator holder 50 and the metal-made compressor housing 10, and the second joint portion J2 between the resin-made accumulator holder 50 and the metal-made accumulator container 26, are laser bonded, for example, the bonding strength between the first joint portion J1 and the second joint portion J2 is properly ensured, so that the mechanical strength of the mounting structure of the accumulator 25 can be ensured.

The following describes other embodiments with reference to the drawings. In a second embodiment, the structure of the accumulator holder is different from that in the first embodiment. Thus, in the second embodiment, the constituent members identical to those of the first embodiment are denoted by the reference signs identical to those of the first embodiment, the description thereof will be omitted, and the accumulator holder will be described.

Second Embodiment

Figure 5:
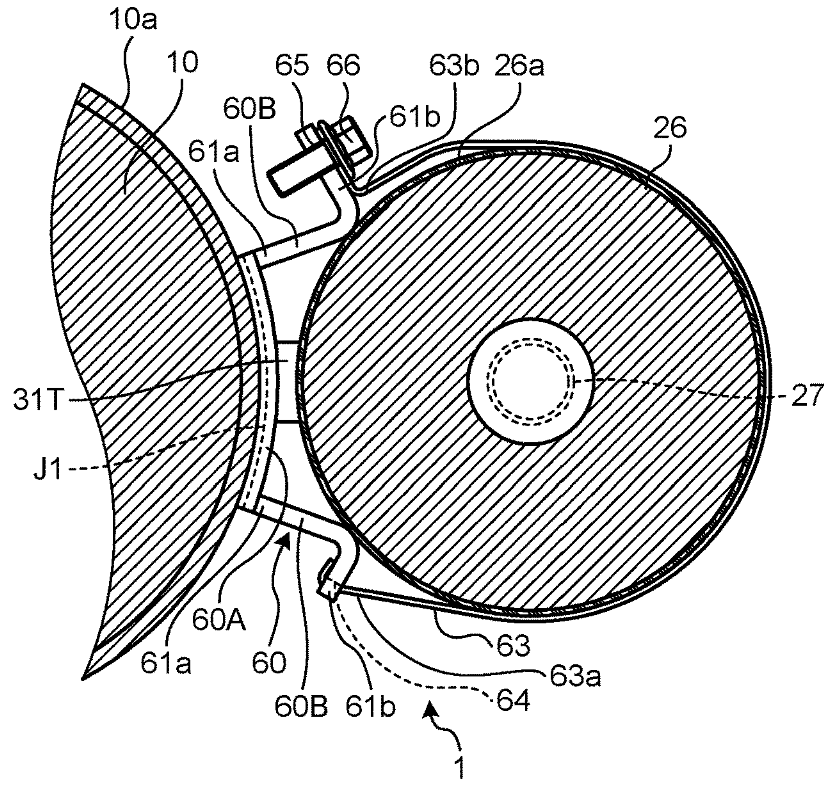
FIG. 5 is a plan view illustrating a principal part of a rotary compressor of a second embodiment.
Figure 6:
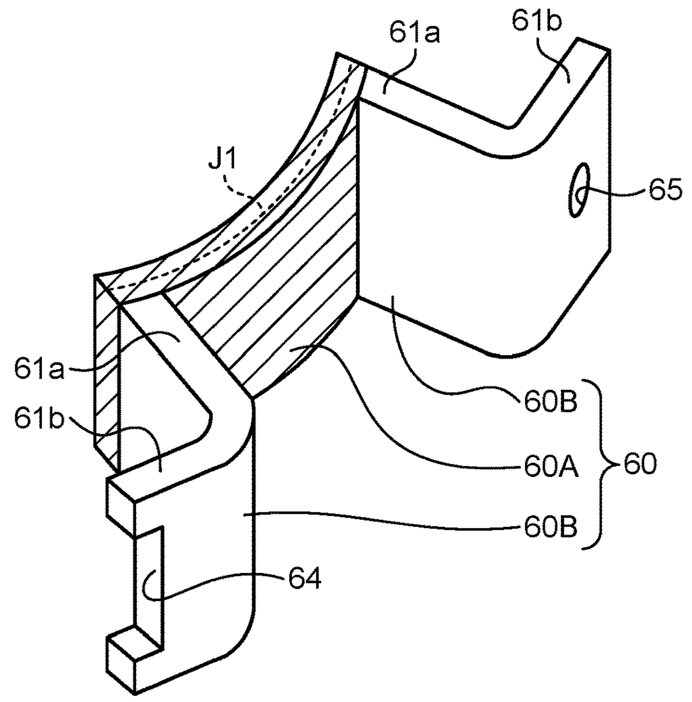
FIG. 6 is a perspective view illustrating an accumulator holder in the rotary compressor of the second embodiment.

FIG. 5 is a plan view illustrating a principal part of a rotary compressor of the second embodiment. FIG. 6 is a perspective view illustrating an accumulator holder in the rotary compressor of the second embodiment.

As illustrated in FIG. 5 and FIG. 6, the rotary compressor of the second embodiment includes an accumulator holder 60 as a mounting member for securing the accumulator 25 to the compressor housing 10. The accumulator holder 60 has a first mounting piece 60A made of a metal material, and a set of second mounting pieces 60B made of a resin material. The first mounting piece 60A and the second mounting pieces 60B are integrally molded by insert molding, for example.

The first mounting piece 60A is formed in an arcuate cross-section that is curved along the outer peripheral surface 10*a* of the compressor housing 10. As metal materials for forming the first mounting piece 60A, for example, iron, copper, aluminum, and the like are used. The first mounting piece 60A has the first joint portion J1, which is joined to the outer peripheral surface 10*a* of the compressor housing 10. The first joint portion J1 is joined to the outer peripheral surface 10*a* of the compressor housing 10 by projection welding, for example. Because the first joint portion J1 is formed by welding metal materials to each other, the bonding strength is increased as compared with laser bonding between a metal material and a resin material. The first joint portion J1 may be joined by spot welding, for example.

The set of second mounting pieces 60B is formed in the same shape only by a resin material. Each second mounting piece 60B has one end portion 61*a*, which is connected to the first mounting piece 60A, and the other end portion 61*b*, which supports the accumulator 25, and is formed in an L-shaped cross-section, in which the one end portion 61*a* and the other end portion 61*b* intersect. Each second mounting piece 60B is connected to both ends of the first mounting piece 60A in the circumferential direction of the compressor housing 10.

In each of the other end portions 61*b* of the set of second mounting pieces 60B, as illustrated in FIG. 5, the accumulator container 26 is secured by a fixing band 63. The fixing band 63 is hung along the circumferential direction of the accumulator container 26, and both ends of the fixing band 63 are fixed to each of the other end portions 61*b*. As illustrated in FIG. 6, in the other end portion 61*b* of one of the second mounting pieces 60B, a groove 64 for hooking one end portion 63*a* of the fixing band 63 is formed. In the other end portions 61*b* of the other of the second mounting pieces 60B, a fixing hole 65 for fixing the other end portion 63*b* of the fixing band 63 with a screw 66 and the like is formed. The fixing band 63 is made of rubber or a steel plate, for example.

As the resin material for forming the second mounting piece 60B, it is preferable that a super engineering plastic such as polyether nitrile (PEN) be used, for example. This allows the second mounting piece 60B to properly ensure the mechanical strength of the portion, which extends from the first mounting piece 60A, and the heat resistance to the compressor housing 10 and the accumulator container 26.

In the second embodiment, the accumulator container 26 has been secured to the other end portions 61*b* of the second mounting pieces 60B of the accumulator holder 60 using the fixing band 63 and the screw 66, but the embodiment is not limited to this structure. Although not illustrated, the other end portion 61*b* of the second mounting piece 60B may have the second joint portion J2 that is joined to the outer peripheral surface 26*a* of the accumulator container 26 by laser bonding. In this case, as with the accumulator holder 50 in the first embodiment, the other end portion 61*b* of the second mounting piece 60B is overlapped on the outer peripheral surface 26*a* of the accumulator container 26, and is irradiated with a laser from the other end portion 61*b* side toward the accumulator container 26 side, thereby joining the resin-made second mounting piece 60B and the metal-made accumulator container 26.

Effect of Second Embodiment

According to the accumulator holder 60 in the second embodiment, the metal-made first mounting piece 60A has the first joint portion J1 that is joined to the outer peripheral surface 10*a* of the compressor housing 10 by welding, so that, as compared with the accumulator holder 50 in the first embodiment, the bonding strength between the compressor housing 10 and the accumulator holder 60 can be increased. In addition, in the second embodiment, the accumulator container 26 is supported by the fixing band 63 and the screw 66 on the second mounting pieces 60B of the accumulator holder 60, so that the laser bonding process between the second mounting piece 60B and the accumulator container 26 can be omitted.

Also in the second embodiment, as with the first embodiment, it is possible to use the accumulator holder 60 at least partially made of a resin material having high vibration-damping properties in order to secure the accumulator container 26 to the compressor housing 10, so that the generation of vibration of the rotary compressor 1 can be suppressed, and the noise associated with the vibration can be reduced.

REFERENCE SIGNS LIST

1 ROTARY COMPRESSOR
10 COMPRESSOR HOUSING
10*a* OUTER PERIPHERAL SURFACE
11 MOTOR
12 COMPRESSION UNIT
25 ACCUMULATOR
26 ACCUMULATOR CONTAINER
26*a* OUTER PERIPHERAL SURFACE
50 ACCUMULATOR HOLDER (MOUNTING MEMBER)
50A MOUNTING PIECE
51*a* ONE END PORTION
51*b* OTHER END PORTION
60 ACCUMULATOR HOLDER (MOUNTING MEMBER)
60A FIRST MOUNTING PIECE
60B SECOND MOUNTING PIECE
61*a* ONE END PORTION
61*b* OTHER END PORTION
105 UPPER SUCTION PIPE (SUCTION PORTION)
104 LOWER SUCTION PIPE (SUCTION PORTION)
107 DISCHARGE PIPE (DISCHARGE PORTION)
J1 FIRST JOINT PORTION
J2 SECOND JOINT PORTION

The invention claimed is:

1. A rotary compressor comprising:

a compressor housing that is provided with a refrigerant discharge portion and a refrigerant suction portion;

a compression unit that is arranged inside the compressor housing and configured to compress a refrigerant, sucked from the suction portion, and discharge the refrigerant from the discharge portion;

a motor that is arranged inside the compressor housing and configured to drive the compression unit;

an accumulator that is connected to the suction portion; and a mounting member that is configured to secure the accumulator to the compressor housing, wherein the compressor housing and an accumulator container of the accumulator are made of a metal material, and the mounting member is made only of a resin material and has a first joint portion, which is bonded to an outer peripheral surface of the compressor housing.

2. The rotary compressor according to claim 1, wherein the mounting member has a second joint portion, which is bonded to the outer peripheral surface of the accumulator container.

3. The rotary compressor according to claim 2, wherein the mounting member has a set of mounting pieces, and each of the set of mounting pieces is provided with the first joint portion at one end portion, and is provided with a second joint portion at another end portion.

4. A rotary compressor comprising:

a compressor housing that is provided with a refrigerant discharge portion and a refrigerant suction portion;

a compression unit that is arranged inside the compressor housing and configured to compress a refrigerant, sucked from the suction portion, and discharge the refrigerant from the discharge portion;

a motor that is arranged inside the compressor housing and configured to drive the compression unit;

an accumulator that is connected to the suction portion; and a mounting member that is configured to secure the accumulator to the compressor housing, wherein the compressor housing and an accumulator container of the accumulator are made of a metal material, the mounting member has a first mounting piece made of a metal material, and a second mounting piece made of a resin material, and the first mounting piece and the second mounting piece are integrally molded.

5. The rotary compressor according to claim 4, wherein the first mounting piece has a first joint portion, and the second mounting piece has a second joint portion, which is joined to an outer peripheral surface of the accumulator container.

6. The rotary compressor according to claim 1, wherein the resin material is a thermoplastic resin material and has a functional group, which is reactive with a metal material.

* * * * *